(12) United States Patent
Straw et al.

(10) Patent No.: US 11,114,891 B2
(45) Date of Patent: Sep. 7, 2021

(54) SELF-AWARE SOFTWARE DEFINED DIGITAL POWER SUPPLY

(71) Applicants: SOFTIRON LIMITED, Chilworth (GB); Phil Straw, Fremont, CA (US)

(72) Inventors: Phil Straw, Fremont, CA (US); Gary Preston, Lancashire (GB); Norman Fraser, Surrey (GB); Mark Chen, Newark, CA (US)

(73) Assignee: SOFTIRON LIMITED, Southampton (GB)

( * ) Notice: Subject to any disclaimer, the term of this patent is extended or adjusted under 35 U.S.C. 154(b) by 429 days.

(21) Appl. No.: 15/503,381

(22) PCT Filed: Aug. 11, 2015

(86) PCT No.: PCT/US2015/044731
§ 371 (c)(1),
(2) Date: Feb. 10, 2017

(87) PCT Pub. No.: WO2016/025531
PCT Pub. Date: Feb. 18, 2016

(65) Prior Publication Data
US 2017/0237286 A1    Aug. 17, 2017

Related U.S. Application Data

(60) Provisional application No. 62/036,025, filed on Aug. 11, 2014.

(51) Int. Cl.
*H02J 9/06* (2006.01)
*H02M 7/04* (2006.01)
(Continued)

(52) U.S. Cl.
CPC ............. *H02J 9/062* (2013.01); *H02J 7/34* (2013.01); *H02J 9/06* (2013.01); *H02M 7/04* (2013.01); *H02J 1/10* (2013.01)

(58) Field of Classification Search
CPC ...... H02J 7/34; H02J 9/06; H02J 9/062; H02J 1/10; H02M 7/04
(Continued)

(56) References Cited

U.S. PATENT DOCUMENTS

| 6,424,119 B1 | 7/2002 | Nelson et al. |
| 2002/0067630 A1* | 6/2002 | Tokunaga ............ H02M 1/4208 363/125 |

(Continued)

FOREIGN PATENT DOCUMENTS

| CN | 2646772 Y | 10/2004 |
| EP | 2658081 A2 | 10/2013 |

(Continued)

OTHER PUBLICATIONS

International Search Report for PCT/US2015/044731 dated Nov. 26, 2015, 3 pages.

(Continued)

*Primary Examiner* — Toan T Vu
(74) *Attorney, Agent, or Firm* — Slayden Grubert Beard PLLC

(57) ABSTRACT

A power supply system which connects a DC consumer to an AC supply includes an AC-DC converter and a UPS. The AC-DC converter has an input to which alternating current from the AC supply is applied and an output at which DC current is developed. The UPS has an input to which direct current from the AC-DC converter is applied and an output at which DC current is developed. The DC current developed at the output of the AC-DC converter and DC current developed at the output of the UPS are applied to the DC consumer selectively in parallel with each other or exclusively to each other.

22 Claims, 4 Drawing Sheets

(51) Int. Cl.
*H02J 7/34* (2006.01)
*H02J 1/10* (2006.01)

(58) Field of Classification Search
USPC .......... 307/20, 23, 46, 64, 66; 700/292, 295;
711/101, 102; 713/150, 151, 153, 155,
713/119, 170, 185; 715/702
See application file for complete search history.

(56) References Cited

U.S. PATENT DOCUMENTS

| | | | | |
|---|---|---|---|---|
| 2003/0184937 | A1* | 10/2003 | Kanouda | H02J 9/061 361/90 |
| 2004/0003304 | A1* | 1/2004 | Kobayashi | G06F 1/266 713/300 |
| 2005/0121979 | A1 | 6/2005 | Matsumoto et al. | |
| 2010/0001687 | A1* | 1/2010 | Watanabe | B60L 53/65 320/109 |
| 2011/0057724 | A1* | 3/2011 | Pabon | H02M 7/219 327/581 |
| 2015/0057827 | A1* | 2/2015 | Uchikawa | G05F 1/66 700/297 |

FOREIGN PATENT DOCUMENTS

| | | | |
|---|---|---|---|
| JP | 63-228968 A | | 9/1988 |
| JP | 2004-148241 A | | 5/2004 |
| JP | 2006262570 | * | 9/2006 |
| JP | 2014-050277 A | | 3/2014 |

OTHER PUBLICATIONS

Written Opinion for PCT/US2015/044731 dated Dec. 8, 2015, 4 pages.

* cited by examiner

SELF-AWARE SOFTWARE DEFINED DIGITAL POWER SUPPLY

CROSS-REFERENCE TO RELATED APPLICATIONS

This application is a U.S. 371 of international application number PCT/US2015/044731, entitled, "Self-Aware, Software Defined, Digital Power Supply," filed on Aug. 11, 2015, which claims priority to U.S. Application No. 62/036,025 entitled, "Self-aware, software defined, digital power supply," filed on Aug. 11, 2014, the entireties of each of which are herein incorporated by reference.

BACKGROUND OF THE INVENTION

The current state of the art for power supplies and their ecosystem is usually singular in the problem it solves. Often power supplies are designed for cost and not efficiency or exception cases. Often there is only common mode for which the power supply is optimized and often the optimization is not high. A typical power supply ecosystem is best seen in FIG. 1.

The power supply can take many design forms. There is a wealth of power supply techniques and the topologies and techniques are well documented, and for many years. There is innovation inside the power supply but encompassing the larger scope of the power train and the power ecosystem is not well refined or optimized.

Relatively recent awareness of efficiency has driven some innovation in efficiency, however the broader design has seen little attention. Energy star is an example of an initial definition of power efficiency but is narrow in scope and the bar is low.

An enabling development for power supply innovation is that some DC electronic systems are reduced in power relative to historical norms. An example is the reduction in power of some computer motherboards. If the power consumption of the DC consumer is very high, power throughput is mandatory. If power throughput is moderate or can be limited through cooperation between the DC consumer and the power supply then innovation over the current state of the art is possible.

DESCRIPTION OF THE INVENTION

Figure 1:
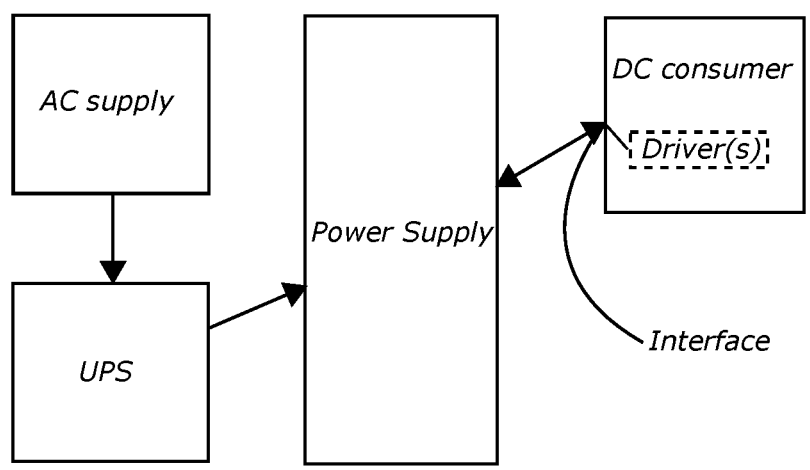
FIGS. 1-2 show a typical power supply ecosystem.
Figure 2:
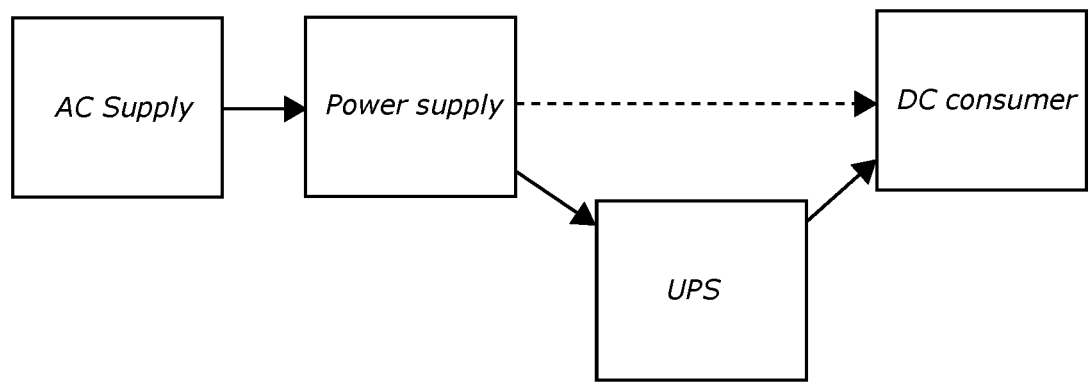

In accordance with the preset invention, a power supply ecosystem is seen in FIG. 2. Providing the UPS on the DC side has a very large change in cost and size versus the resulting duration of the UPS. In the prior art, a UPS is charged from AC, stores energy in a battery in DC form after conversion (never 100% efficient), then inverts the DC when the UPS is needed (AC power removed) and this is also never 100% efficient. Just to provide a backup to AC has had two efficiency expenses. The main AC to DC power stage is typically far from perfectly efficient.

Collocating the UPS next to the DC consumer allows for reduced switching speed (glitch less), constant live supply forgiving brownouts, high efficiency, voltage matching of the energy store and the DC consumer for efficient conversion on supply, historical loss of efficiency in charge but high efficiency in demanded supply leading to low cost and size versus the resulting duration of the UPS.

The topology of FIG. 2 also provides that power can be provided either from the main AC/DC stage of power delivery but also in parallel from the UPS. This provides a form of redundancy but beyond that it allows significant changes to the primary AC/DC stage that would otherwise cause a failure of operation in DC consumers. One example would be to switch the power supply to the DC consumer and UPS on and off at the AC source and use the UPS. This allows the power supply to be tuned for efficiency with one power specification matched to the UPS. Another use for this topology is to filter the AC/DC supply to provide accurate power isolating AC supply events from the DC consumer. Other techniques for this exist but a DC side UPS is believed to be novel. Extending on the last function of filtering the UPS could provide accurate power and allow the AC/DC stage to be extremely tuned for efficiency of total energy delivery with poor regulation of supply; variability of supply to the UPS charging is an easy and well understood problem to deal with.

Battery chemistries like Lithium Ion and Lithium polymer provide many characteristics that are favorable in such a DC side UPS function. Traditionally these batteries are charged with constant current and then constant voltage once the batteries' nominal voltage has been reached. By only charging the UPS to voltages that are below the nominal voltage the batteries can always be charge with constant current. This forgoes maximal energy store and is not common, but the novelty and total energy store loss enables the techniques above to always guarantee a constant current to the UPS and from the AC/DC stage. No variability on power supplies allows for tuning for efficiency. Also if a power supply has a narrow enough specification for power characteristics, very extreme design can result in very high efficiency but would not normally be practical because in real world DC consumer applications very narrow power characteristics are not possible. But turning the AC on and off and filtering via the DC side UPS all of this can be enabled.

Filtering via the DC side UPS provides also for isolation of the DC load from the AC supply. This provides not only tuning possibilities in the AC/DC stage but also provides isolation from inductive and capacitive loads in the DC consumer. This results in a reduction in the need for power factor correction (PFC). The AC/DC stage described in the schematic section provides for active PFC but is allowed to work more efficiently by providing rates of change and magnitude that is lower. Also providing budget in the components selection of the design.

Often a UPS is not indigenous to the DC consumer of its energy. Often a UPS serves more than one DC consumer. Currently UPS systems use AC power and the consumers are anonymous.

If the DC consumer was aware of the UPS and/or it's charge level it could take actions in its operation relative to that information. If the AC/DC power supply was monitored in operation the DC consumer could be informed of its performance and also secondly of its health. If the AC power supply were monitored the collection of information would lead to left awareness. Measurement of power source and DC consumption would lead to efficiency information and awareness. Presented to a DC consumer that runs an operating system this could be configured as a "device." A device driver would abstract the interface to the power system and allow two-way communication for configuration and monitoring/notification. Via some communication mechanism (e.g., AC power comms as discussed below, Data communications like TCP/IP network) it would be possible to not only monitor power characteristics but pool groups of equipment per AC circuit, fused group, backup power group or by any affinity group that provided useful metadata for power planning, costing, and future planning. Self-awareness of the power system could allow feedback to the AC supply system itself. For example a DC consumer could let the AC system know that it does not plan high load for the next hour, and that if it did it could use the UPS for supplement. As such AC load control, temporary source isolation or AC backup power planning could be allowed. Exemplarily, total power backup delivery may be reduced and be known to be guaranteed to be adequate. Sharing of adjacent UPS power between DC consumers would magnify this effect.

A stark example of the need for the above is in data centers that require large amounts of power and large backup contingencies.

Self-awareness can be enabled via the two sense diagrams in the schematics section. Features of these circuits and therefore values available in a self-aware power supply, OR via a device driver in a self-aware DC consumer are:
Active, Reactive and Apparent Power
Power factor
True RMS Current
RMS Voltage
Line Frequency
Real time Voltage
Real time Current
Real-time Input Power
Temperatures high and low side
Frequency
DC voltage
DC current
DC power
Peak DC consumption
Average DC consumption By presenting this information as a device driver in an operating system it allows any application to interface to the power supply. This may allow adaptive power aware behavior, notifications about events etc.

Any communication can deliver the above self-awareness to allow logging, recording, historical data for planning and audit. It can provide event data and instrument power at all stages of consumption.

Having AC power comms allows the awareness above direct to the primary source of power without the need for any external comms infrastructure. The nature of the power data is low bandwidth even for large numbers of devices and as such it is feasible to use known AC comms techniques but for power data.

Second order awareness of peers via the AC communication can be achieved via monitoring. Device drivers in an operating system can use this to source information from "remotely mounted devices". As such all that is needed for awareness monitoring is a self-aware power system.

Distributed AC quality monitoring and feedback is also possible providing benefit to the AC power supplier.

Figure 3:
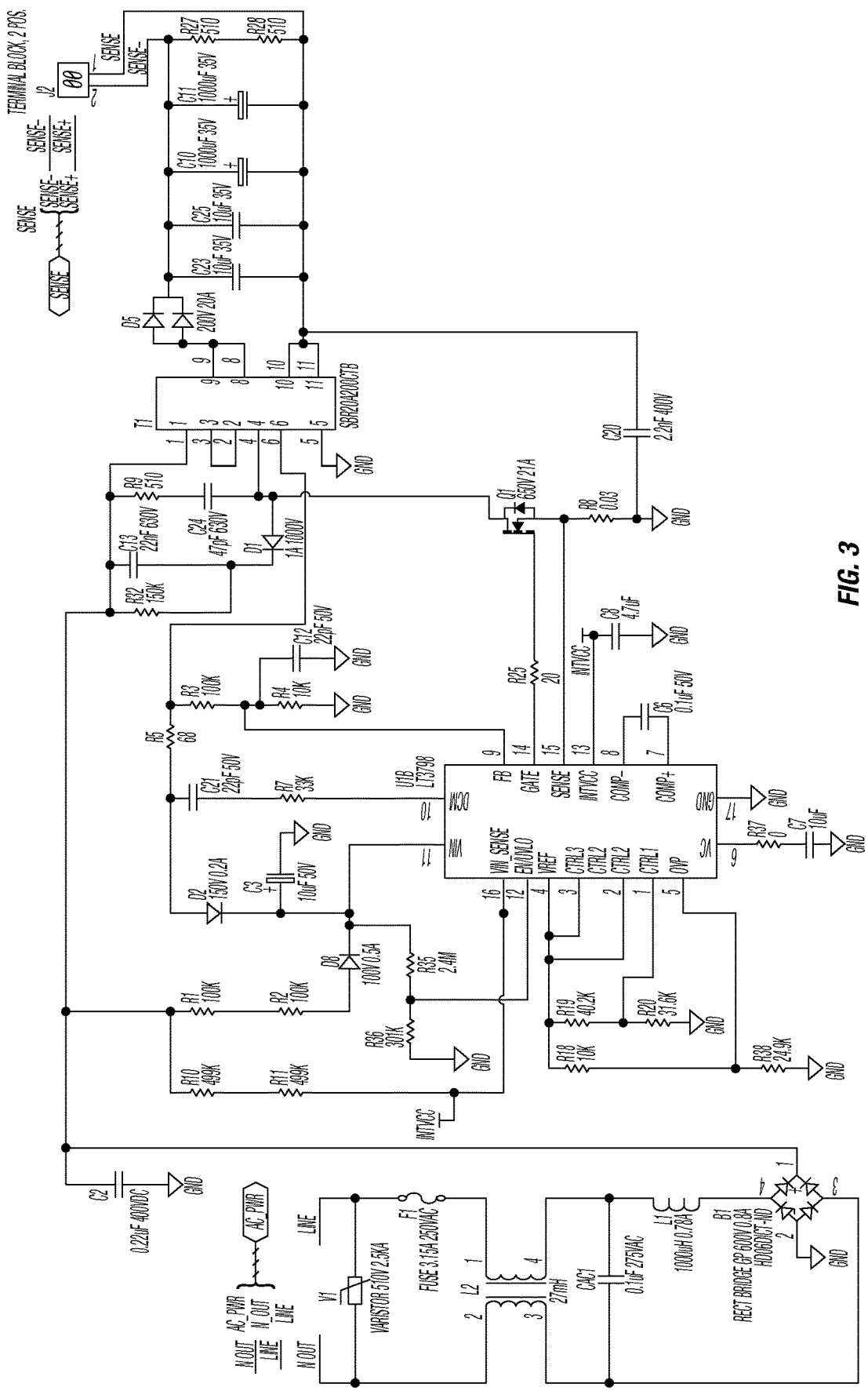
FIGS. 3-5 show an AC-DC topology.
Figure 4:
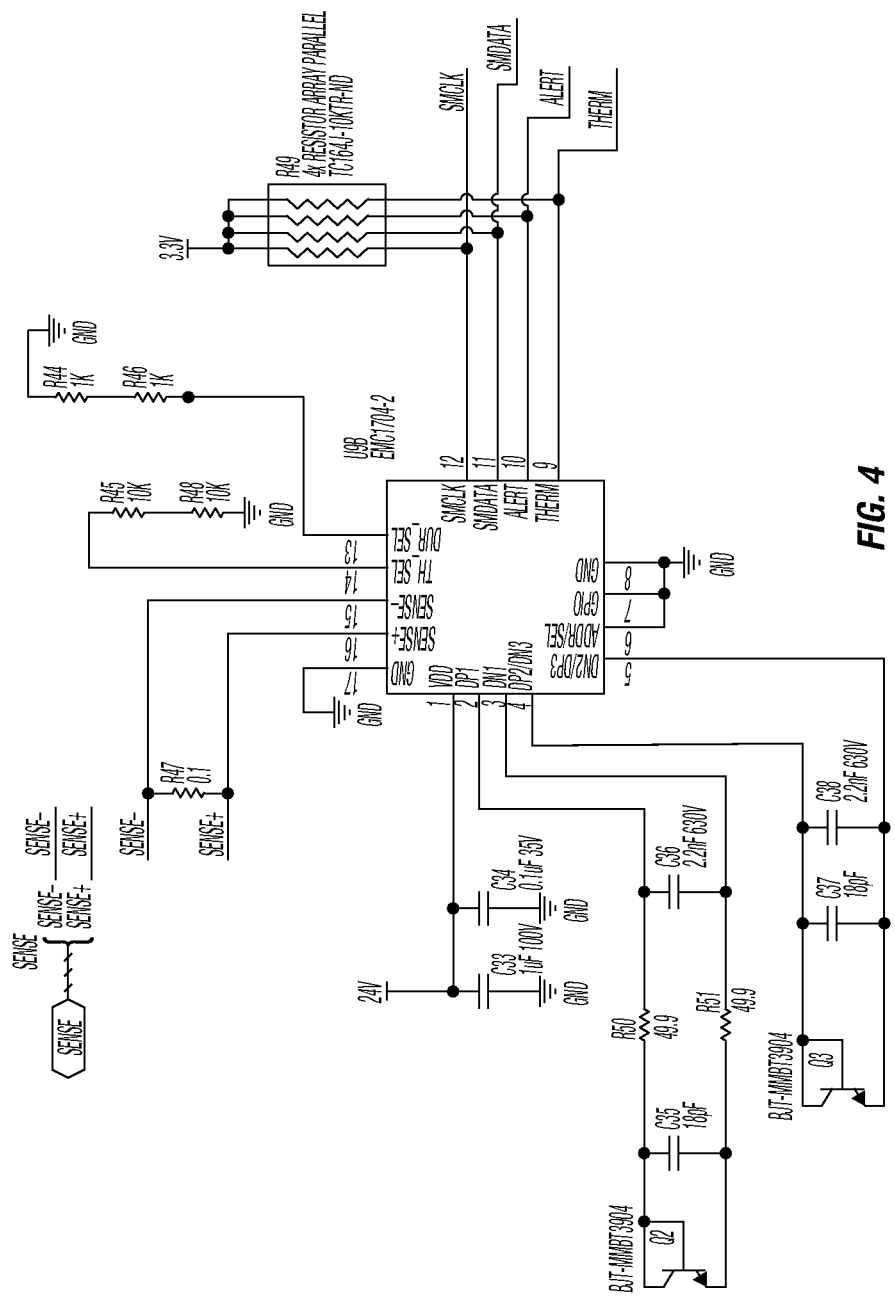
Figure 5:
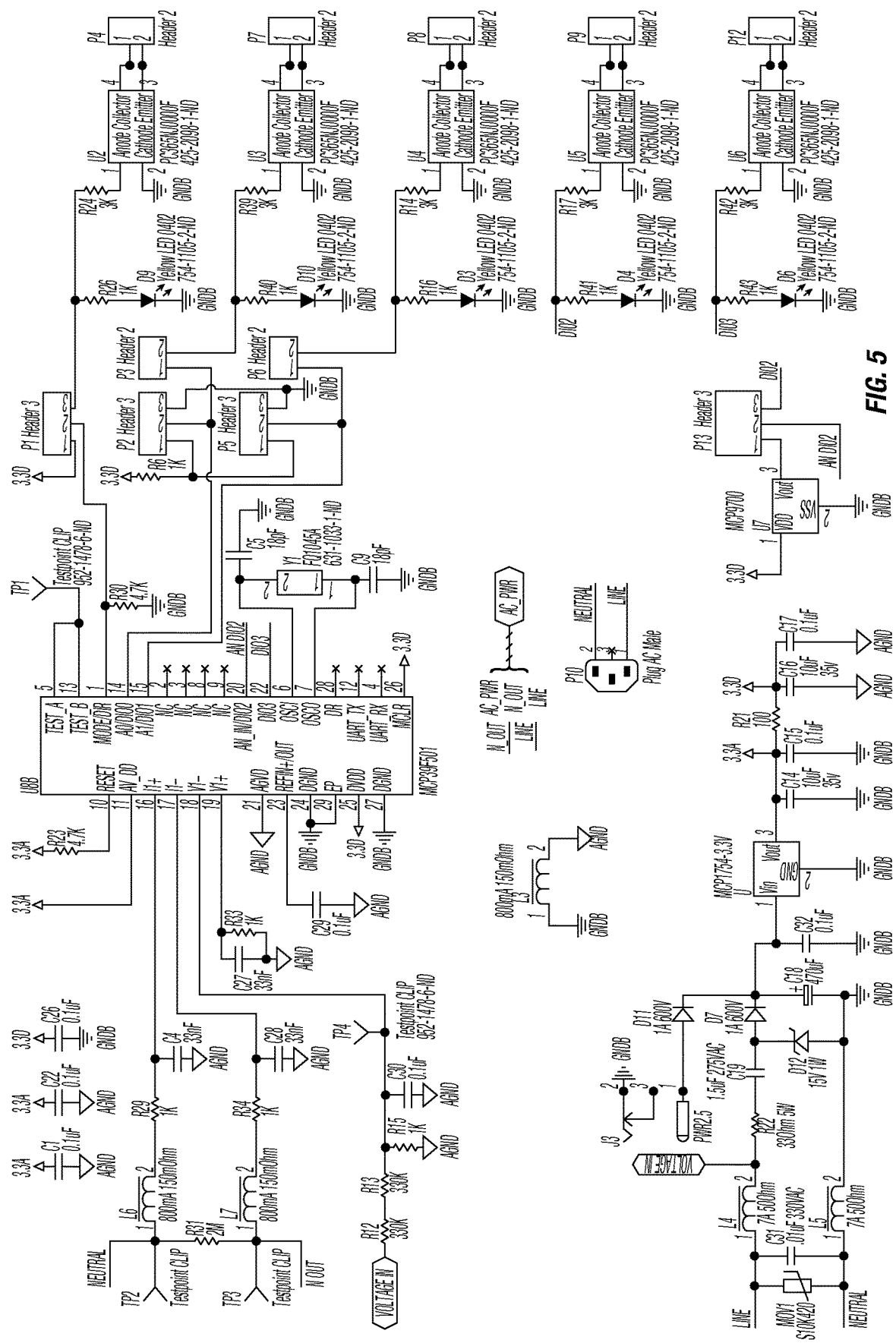

FIGS. 3-5 show an AC-DC topology. This topology provides efficiencies approaching 90% and silicon here is modern and provides minimal need for external components. It also enables constant voltage and constant current regulation as mentioned above.

Transformer losses are a combination of core losses and coil losses. The core losses consist of those generated by energlzmg the laminated steel core. These losses are virtually constant from no-load to full-load, and for the typical 150 Crise transformer are about 0.5% of the transformer's full-load rating. The coil losses are also called load losses because they are proportional to the load on the transformer. These coil losses make up the difference between the 0.5% losses for the core and range from 1.5% to 2% of the total load. Making load constant or at least less variable and tuning for efficiency of the supply not regulation of the result is key to efficiency combined with the acknowledgments about transformers above. Note the mechanism uses two quality transformers in a fly back design.

Cooperation as described above is by sharing power awareness information for planning is a potential source of failure if the information is not correct. As such this could be a potential security problem in an attack against infrastructure. As such it may be important that power supplies are known to be genuine and that they authenticate themselves to consumers of their power and their data. As such via communications (e.g.: AC comms) or via a local bus like I2C on a computer motherboard it makes sense that anything that mounts a device driver to communicate with the power supply it is authenticated. A power supply with a device driver that is authenticated necessarily to function. If AC comms is used then it has the advantage that power can be denied on failed authentication, done directly via the AC power source. The owner of the AC source or facility with AC source can be assured. The builder of a DC consumer system can be assured the power supply is known well from a known manufacturer. Manufacturers can be assured that their products are secured from grey sourcing.

Application interfacing (and perhaps kernel interaction) may need to be authenticated for control functions and perhaps notifications and information updates.

As such the power supply may have a crypto- graphic and/or unique identity. Direct AC or other communication may give the power supply a MAC address as a network media identity. Communication from the power supply direct is enabled and may have a network level address e.g.: TCP/IP network with an IP address. As such the power supply could be addressed directly via the Internet.

Power supply communication direct to a DC consumer maybe via a local bus like I2C but USB provides other advantages. For example existing device classes exist for UPS devices. This may provide existing infrastructure and applications to work without change or knowledge of a novel power supply. For example presenting the device as a USB HID class UPS device would provide awareness of AC power and battery backup status in existing application and operating systems.

By adding a microcontroller into the power supply that bootstraps from AC and can take power from the UPS energy source it is possible to communicate with the DC consumer via I2C, USB or other. Termination of AC comms and other direct communication like ethernet can be controlled inside the power supply. Monitoring of the AC and DC monitors can be coordinated and communicated from the microcontroller. AC switching, UPS charging, and AC/DC operation can be controlled from the microcontroller. Changes in behavior can be specified via the comms interfaces or by re-programming via a USB bootloader.

The invention claimed is:
1. A power supply system for connecting a DC consumer to an AC supply comprising:
   an interface to a device driver that communicates with the power supply system;
   an AC-DC converter having an input to which alternating current from the AC supply is applied and an output at which DC current is developed; and a UPS having an input to which direct current from the AC-DC converter is applied and an output at which DC current is developed;
wherein DC current developed at the output of the AC-DC converter and the DC current developed at the output of the UPS are applied to the DC consumer selectively in parallel with each other or exclusively to each other;
wherein the AC-DC converter is switched on and off and the DC current developed at the output of the UPS is applied to the DC consumer; and
wherein:
if the device driver is not authenticated, the DC current is turned off;
use of the AC-DC converter and use of the UPS is controlled based on a communication generated by the DC consumer; and
the communication generated by the DC consumer is based upon information provided to the DC consumer about operation of the UPS or the AC-DC converter.

2. A power supply system as set forth in claim 1, wherein the UPS monitors operation of the AC-DC converter to control the current developed at the output of the UPS which is applied to the DC consumer.

3. A power supply system as set forth in claim 1, wherein switching the AC-DC converter on and off and applying the DC current developed at the output of the UPS to the DC consumer allows tuning of the power supply system for efficiency to match the UPS.

4. A power supply system as set forth in claim 1, wherein switching the AC-DC converter on and off and applying the DC current developed at the output of the UPS allows charging of batteries of the UPS with constant current.

5. A power supply system as set forth in claim 1, further comprising a two-way communication mechanism between the DC consumer and the power supply system that permits monitoring of and feedback to the power supply system.

6. A power supply system as set forth in claim 5, wherein the two-way communication mechanism comprises the device driver, and the device driver allows adaptive power aware behavior.

7. A power supply system as set forth in claim 5, wherein the two-way communication mechanism uses a cryptographic identity.

8. A power supply method of connecting a DC consumer to an AC supply in a power supply system comprising the steps of:
interfacing to a device driver that communicates with the power supply system;
using an AC-DC converter having an input to which alternating current from the AC supply is applied and an output at which DC current is developed;
using a UPS having an input to which direct current from the AC-DC converter is applied and an output at which DC current is developed;
applying DC current developed at the output of the AC-DC converter and DC current developed at the output of the UPS to the DC consumer selectively in parallel with each other or exclusively to each other;
switching the AC-DC converter on and off and applying the DC current developed at the output of the UPS to the DC consumer;
attempting to authenticate the device driver; and
turning off the DC current if the device driver is not authenticated;
wherein:
using the AC-DC converter and using the UPS is controlled based on a communication generated by the DC consumer; and
the communication generated by the DC consumer is based upon information provided to the DC consumer about operation of the UPS or the AC-DC converter.

9. A power supply method as set forth in claim 8, wherein the UPS monitors operation of the AC-DC converter to control the current developed at the output of the UPS which is applied to the DC consumer.

10. A power supply method as set forth in claim 8, wherein switching the AC-DC converter on and off and applying the DC current developed at the output of the UPS to the DC consumer allows tuning of the power supply system for efficiency to match the UPS.

11. A power supply method as set forth in claim 8, wherein switching the AC-DC converter on and off and applying the DC current developed at the output of the UPS allows charging of batteries of the UPS with constant current.

12. A power supply method as set forth in claim 8, further comprising the step of using a two-way communication mechanism between the DC consumer and the power supply method to permit monitoring of and feedback to the power supply system.

13. A power supply method as set forth in claim 12, further comprising the step of using the device driver as part of the two-way communication mechanism to allow adaptive power aware behavior.

14. A power supply method as set forth in claim 12, further comprising the step of using a cryptographic identity in the two-way communication mechanism.

15. A power supply system as set forth in claim 7, wherein the cryptographic identity is used for purposes of infrastructure security.

16. A power supply method as set forth in claim 14, wherein the cryptographic identity is used for purposes of infrastructure security.

17. A power supply system as set forth in claim 1, wherein the DC current developed at the output of the AC-DC converter and the DC current developed at the output of the UPS are configured to be applied to the DC consumer selectively by exclusively using the DC current developed at the output of the UPS when power is available from the AC-DC converter.

18. A power supply system as set forth in claim 1, wherein the DC current developed at the output of the AC-DC converter and the DC current developed at the output of the UPS are configured to be applied to the DC consumer selectively by exclusively using the DC current developed at the output of the UPS while switching off the AC-DC converter.

19. A power supply as set forth in claim 3, wherein tuning of the power supply system for efficiency to match the UPS includes tuning output of the AC/DC converter with a power specification matched to the UPS.

20. A power supply system as set forth in claim 1, wherein:
the communication generated by the DC consumer is configured to specify that:
the DC consumer will not require power for a higher load for a duration of time; and
during the duration of time, the DC consumer can be sufficiently powered by the UPS; and the AC-DC converter is configured to reduce power to the DC consumer and to the UPS during the duration of time based upon the communication generated by the DC consumer.

21. A power supply system as set forth in claim 4, wherein switching the AC-DC converter on and off and applying the DC current developed at the output of the UPS to charge of batteries of the UPS with constant current includes charging the UPS only up to voltages that are below a nominal voltage.

22. A power supply system as set forth in claim 1, wherein the DC current developed at the output of the AC-DC converter and available to be provided to the DC consumer and UPS is configured to be switched on and off simultaneously to both the DC consumer and the UPS.

* * * * *